United States Patent
Chang et al.

(10) Patent No.: US 12,300,266 B2
(45) Date of Patent: May 13, 2025

(54) COMPUTING DEVICE FOR ATTENTION-BASED JOINT TRAINING WITH NOISE SUPPRESSION MODEL FOR SOUND EVENT DETECTION TECHNOLOGY ROBUST AGAINST NOISE ENVIRONMENT AND METHOD OF THEREOF

(71) Applicant: IUCF-HYU (INDUSTRY-UNIVERSITY COOPERATION FOUNDATION HANYANG UNIVERSITY), Seoul (KR)

(72) Inventors: Joon-Hyuk Chang, Seoul (KR); Jin Young Son, Seoul (KR)

(73) Assignee: IUCF-HYU (INDUSTRY-UNIVERSITY COOPERATION FOUNDATION HANYANG UNIVERSITY), Seoul (KR)

(*) Notice: Subject to any disclaimer, the term of this patent is extended or adjusted under 35 U.S.C. 154(b) by 304 days.

(21) Appl. No.: 17/960,563

(22) Filed: Oct. 5, 2022

(65) Prior Publication Data
US 2023/0186940 A1 Jun. 15, 2023

(30) Foreign Application Priority Data
Dec. 13, 2021 (KR) .................. 10-2021-0177369

(51) Int. Cl.
 G10L 25/51 (2013.01)
 G10L 15/20 (2006.01)
 G10L 25/30 (2013.01)

(52) U.S. Cl.
 CPC .............. G10L 25/51 (2013.01); G10L 15/20 (2013.01); G10L 25/30 (2013.01)

(58) Field of Classification Search
 CPC .......... G10L 25/51; G10L 25/30; G10L 15/20
 See application file for complete search history.

(56) References Cited

U.S. PATENT DOCUMENTS 11,074,927 B2* 7/2021 Liang .................. G10L 25/30
11,308,939 B1* 4/2022 Gao .................... G10L 15/142
(Continued)

FOREIGN PATENT DOCUMENTS

| JP | 2016-180839 A | 10/2016 |
| KR | 10-2071-0030923 A | 3/2017 |
| KR | 10-2021-0098083 A | 8/2021 |

OTHER PUBLICATIONS

Son, Jin-Young, and Joon-Hyuk Chang. "Attention-based joint training of noise suppression and sound event detection for noise-robust classification." Sensors 21.20 (2021): 6718. (Year: 2021).*
(Continued)

*Primary Examiner* — Douglas Godbold
(74) *Attorney, Agent, or Firm* — Sughrue Mion, PLLC (57) ABSTRACT

Various embodiments relate to a computing device for attention-based joint training with a noise suppression model for a sound event detection (SED) technology that is robust against a noise environment and a method thereof, and are intended to improve SED performance that is robust against a noise environment by using a joint model in which a noise suppression model and an SED model have been jointed. According to various embodiments, an attention scheme and a weight freezing scheme are added to the joint model.

7 Claims, 6 Drawing Sheets

(56) References Cited

U.S. PATENT DOCUMENTS

| | | | | |
|---|---|---|---|---|
| 11,830,519 | B2* | 11/2023 | Gevrekci | G10L 25/21 |
| 2018/0053087 | A1* | 2/2018 | Fukuda | G06N 3/045 |
| 2018/0261225 | A1* | 9/2018 | Watanabe | G10L 15/28 |
| 2022/0084509 | A1* | 3/2022 | Sivaraman | G06N 3/045 |
| 2022/0383887 | A1* | 12/2022 | Wang | G10L 25/51 |
| 2022/0406295 | A1* | 12/2022 | Weninger | G10L 21/0208 |
| 2023/0032385 | A1* | 2/2023 | Zhang | G06F 17/16 |
| 2023/0186939 | A1* | 6/2023 | Tang | G06F 17/15 |
| | | | | 381/56 |

OTHER PUBLICATIONS

Korean Office Action issued Sep. 23, 2024 by the Korean Patent Office corresponding to Korean patent application No. 10-2021-0177369.

\* cited by examiner

COMPUTING DEVICE FOR ATTENTION-BASED JOINT TRAINING WITH NOISE SUPPRESSION MODEL FOR SOUND EVENT DETECTION TECHNOLOGY ROBUST AGAINST NOISE ENVIRONMENT AND METHOD OF THEREOF

CROSS-REFERENCES TO RELATED APPLICATIONS

This application is based on and claims priority under 35 U.S.C. 119 to Korean Patent Application No. 10-2021-0177369, filed on Dec. 13, 2021 in the Korean intellectual property office, the disclosures of which are herein incorporated by reference in their entireties.

TECHNICAL FIELD

Various embodiments relate to a computing device for attention-based joint training with a noise suppression model for a sound event detection (SED) technology robust against a noise environment and a method thereof.

BACKGROUND OF THE DISCLOSURE

A sound event detection (SED) technology is a technology for finding temporal information at the start location and end location of a sound which is generated with respect to an input signal that is input to a microphone and classifying the type (e.g., the sound of a horse, a cough, or a ringtone) of the sound. The technology is a technology used in a smart meeting room, autonomous driving, and social care, and includes the detection of a sound situation and the detection of an abnormal sound as similar technologies. A conventional SED technology has used a Gaussian mixture model, a hidden Markov model, and a conventional shallow learning model approach such as Random Forest. Methodologies, such as a support vector machine (SVM) and non-negative matrix factorization (NMF), have also been suggested as the SED technology. Recently, as the deep learning-based methodology emerges, a feature vector is extracted from a sound event signal and then used as an input to a neural network. There has been presented a method of training a model as a system in which the probability that each sound event corresponding to the number of classes is present is used as an output. A convolutional neural network (CNN) model and a recurrent neural network (RNN) model have been proposed as examples of the model. A convolutional recurrent neural network (CRNN) in which the CNN model and the RNN model are jointed is presented, which has greatly improved performance of SED classification. Various types of SED research using the CRNN have been performed. Joint research with a location estimation technology field in addition to research for classifying sounds that simultaneously occur has been performed.

Research variously performed in relation to SED has a goal that the SED is finally applied to a real environment. However, such application is affected by noise that remains in an actual environment, and has a difficulty in obtaining desired performance. Examples of SED research related thereto include an exemplar-based noise suppression method of directly removing noise from the existing feature by extracting a section in which the noise is present in terms of the feature and SED research that is robust against a noise signal that interferes through frequency band weighting. However, research that is robust against a noise environment has not been actively researched, compared to SED research for classifying two sounds that are simultaneously present in one frame, joint research with location estimation, and weakly-labeled SED research. In the voice recognition field, research for being jointed with a voice improvement model at the front stage of a voice recognition system for the voice recognition system that is robust against noise has been performed. Research in which a sound source separation-based model is used as a kind of noise suppression function so that a voice including music is separated as an original voice has also been performed. As described above, the conventional SED technology has been performed for the improvement of performance through a structure variation of a neural network model or as research for simultaneous execution through a joint with another technology (e.g., location estimation). In contrast, research that is robust against a noise environment has not been a lot performed compared to the voice recognition field. The reason for this is that a sound signal has more various characteristic than a voice signal.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Various embodiments are intended to improve sound event detection (SED) performance that is robust against a noise environment by joining a noise suppression model based on a deep neural network (DNN) and an SED model and then performing fine-tuning for re-training the jointed model.

Various embodiments are intended to improve SED performance that is robust against a noise environment by adding, to the jointed model, an attention scheme and a method of fixing a learnable weight.

Various embodiments provide a computing device for attention-based joint training with a noise suppression model for an SED technology that is robust against a noise environment and a method thereof.

According to various embodiments, a computing device includes a memory, and a processor connected to the memory and configured to execute at least one instruction stored in the memory. The processor includes a joint model in which a noise suppression (NS) model and a sound event detection (SED) model have been jointed, and may be configured to perform noise suppression and sound event detection on an input signal by using the joint model.

According to various embodiments, a method of a computing device may include detecting, by a joint model in which a noise suppression model and a sound event detection (SED) model have been jointed, an input signal, performing, by the noise suppression model, noise suppression on the signal, and performing, by the SED model, SED on the output of the noise suppression model.

Various embodiments can improve SED performance that is robust against a noise environment by using the joint model in which the noise suppression model and the SED model are jointed. Various embodiments can improve robust SED performance by being applied to various SED-based applications in an actual environment in which noise is present.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

While illustrative embodiments have been illustrated and described, it will be appreciated that various changes can be made therein without departing from the spirit and scope of the disclosure.

Hereinafter, various embodiments of the present disclosure are described with reference to the accompanying drawings.

Figure 1:
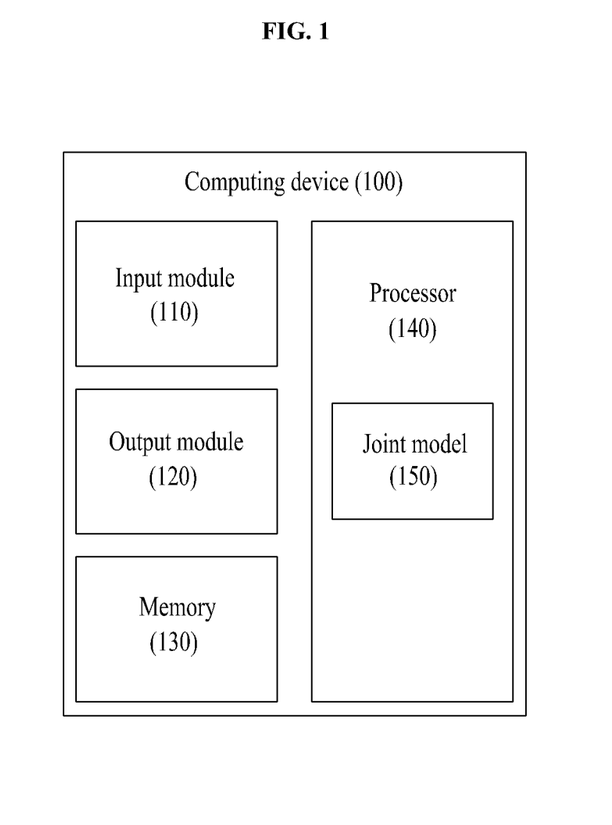
FIG. 1 is a diagram schematically illustrating a computing device according to various embodiments.

FIG. 1 is a diagram schematically illustrating a computing device 100 according to various embodiments.

Referring to FIG. 1, the computing device 100 according to various embodiments may include at least one of an input module 110, an output module 120, a memory 130, or a processor 140. In an embodiment, at least one of the components of the computing device 100 may be omitted, and at least one other component may be added to the computing device 100. In an embodiment, at least two of the components of the computing device 100 may be implemented as a single integrated circuit.

The input module 110 may receive a signal to be used for at least one component of the computing device 100. The input module 110 may include at least one of an input device configured to enable a user to directly input a signal to the computing device 100, a sensor device configured to generate a signal by sensing a surrounding change, or a reception device configured to receive a signal from an external device. For example, the input device may include at least one of a microphone, a mouse, or a keyboard. In an embodiment, the input device may include at least one of touch circuitry configured to detect a touch or a sensor circuit configured to measure the intensity of a force generated by a touch. In an embodiment, the input module 110 may obtain a sound event input. For example, the microphone may receive a sound event input around the computing device 100.

The output module 120 may output information to the outside of the computing device 100. The output module 120 may include at least one of a display device configured to visually output information, an audio output device capable of outputting information in the form of an audio signal, or a transmission device capable of wirelessly transmitting information. For example, the display device may include at least one of a display, a hologram device or a projector. For example, the display device may be assembled with at least one of the touch circuit or sensor circuit of the input module 110, and thus may be implemented as a touch screen. For example, the audio output module may include at least one of a speaker or a receiver.

According to an embodiment, the reception device and the transmission device may be implemented as a communication module. The communication module may perform communication with an external device in the computing device 100. The communication module may establish a communication channel between the computing device 100 and the external device, and may perform communication with the external device through the communication channel. In this case, the external device may include at least one of a vehicle, a satellite, a base station, a server or another computer system. The communication module may include at least one of a wired communication module or a wireless communication module. The wired communication module is connected to the external device in a wired way, and may communicate with the external device in a wired way. The wireless communication module may include at least one of a short-distance communication module or a long-distance communication module. The short-distance communication module may communicate with the external device using the short-distance communication method. For example, the short-distance communication method may include at least one of Bluetooth, WiFi direct, or infrared data association (IrDA). The long-distance communication module may communicate with the external device using the long-distance communication method. In this case, the long-distance communication module may communicate with the external device over a network. For example, the network may include at least one of a cellular network, the Internet, or a computer network, such as a local area network (LAN) or a wide area network (WAN).

The memory 130 may store various data used by at least one component of the computing device 100. For example, the memory 130 may include at least one of a volatile memory or a nonvolatile memory. The data may include at least one program and input data or output data related thereto. The program may be stored in the memory 130 as software including at least one instruction, and may include at least one of an operating system, middleware, or an application.

The processor 140 may control at least one component of the computing device 100 by executing a program of the memory 130. Accordingly, the processor 140 may perform data processing or an operation. In this case, the processor 140 may execute an instruction that is stored in the memory 130. According to various embodiments, the processor 140 may obtain a joint model 150 for a sound event detection (SED) technology that is robust against a noise environment. For example, the processor 140 may obtain the joint model 150 that is previously stored in the memory 130 or the processor 140 may obtain the joint model 150 from an external computing device or a server which communicates with the computing device 100 through a communication module. Accordingly, the processor 140 may perform noise suppression and SED on a sound event input by applying the joint model 150 to the sound event input. The processor 140 may identify the type of input sound event by applying the joint model 150 to the sound event input. For example, the processor 140 may identify whether an input sound event is a voice or cough sound of a user, a knock, or the ringtone of a mobile phone by using the joint model 150, but the present disclosure is not limited thereto. That is, the present disclosure has a technical effect in that it improves SED performance while being less influenced by noise around computing device 100 due to the artificial intelligence technology.

Furthermore, the processor 140 may pre-process the output of a pre-trained noise suppression model to be described later or the input of a pre-trained SED model to be described later so that the joint model 150 is used for noise suppression and SED. For example, the processor 140 may process the input of the pre-trained noise suppression model or the output of the pre-trained SED model in a preset format.

Figure 2:
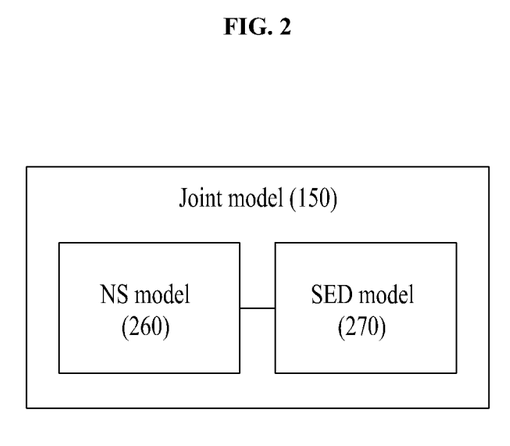
FIG. 2 is a diagram specifically illustrating a joint model according to various embodiments.
Figure 3:
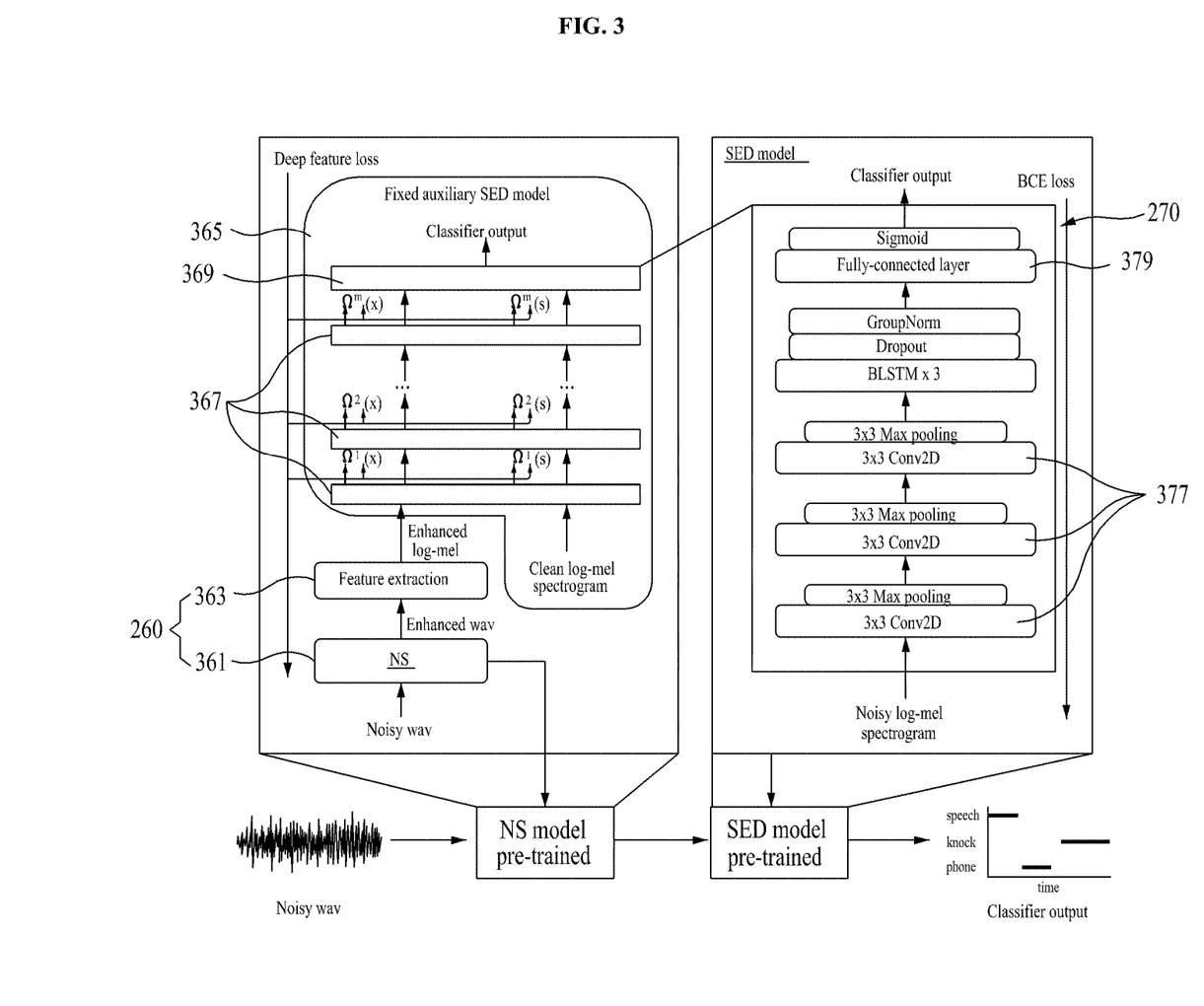
FIG. 3 is a diagram for exemplifying the pre-training of a noise suppression model and a sound event detection (SED) model in FIG. 2.
Figure 4:
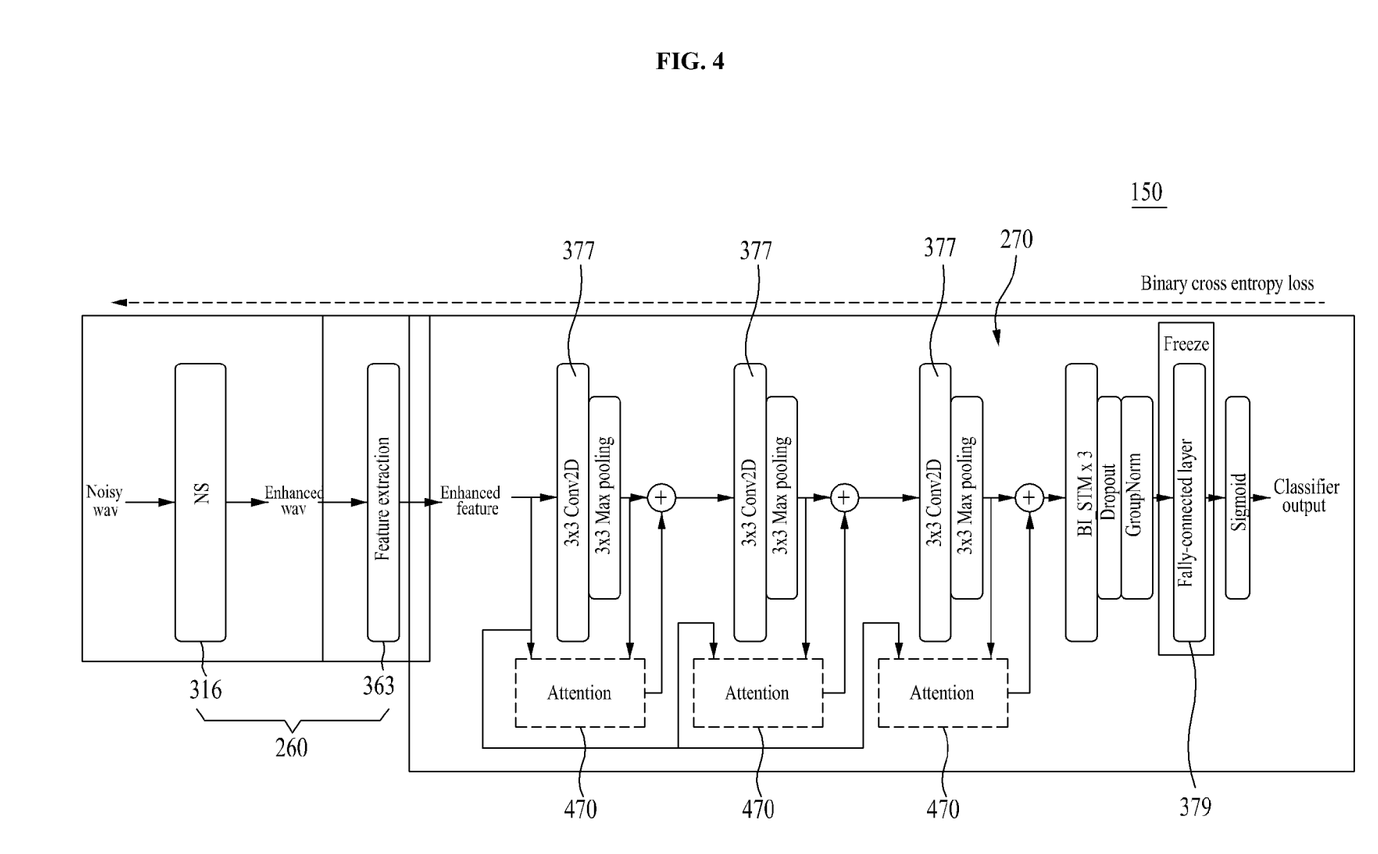
FIG. 4 is a diagram exemplifying the joint model according to various embodiments.
Figure 5:
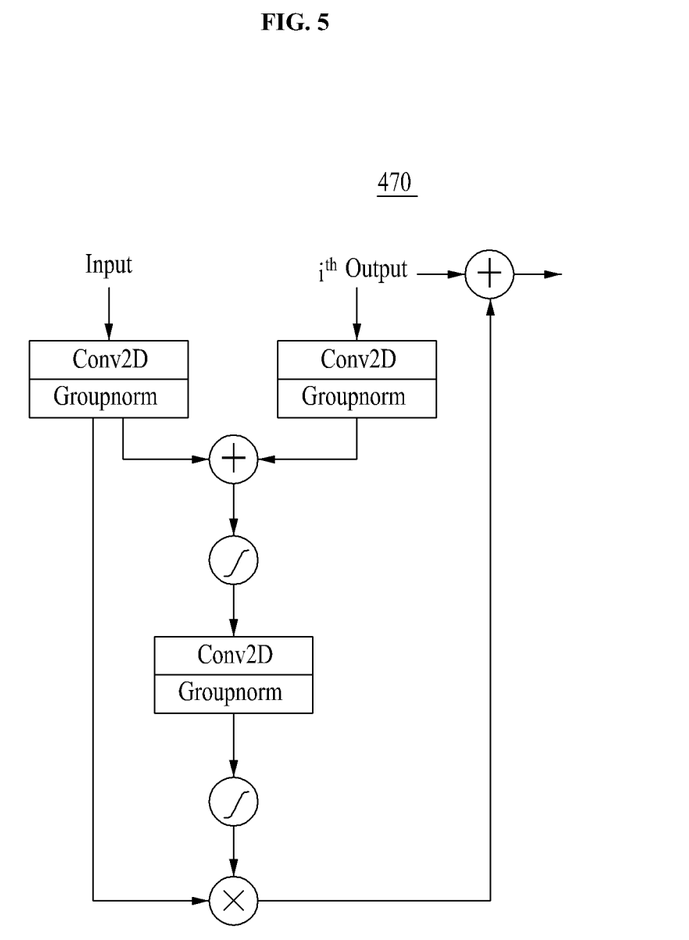
FIG. 5 is a diagram exemplifying an attention module.

FIG. 2 is a diagram specifically illustrating the joint model 150 according to various embodiments. FIG. 3 is a diagram for exemplifying the pre-training of a noise suppression model 260 and an SED model 270 in FIG. 2. FIG. 4 is a diagram exemplifying the joint model 150 according to various embodiments. FIG. 5 is a diagram exemplifying an attention module 470.

Referring to FIG. 2, the joint model 150 may include the noise suppression model 260 and the SED model 270, and may be implemented as the noise suppression model 260 and the SED model 270 are jointed.

The noise suppression model 260 may output an output close to clean data, that is, enhanced data, by performing noise suppression on a sound event input. In some embodiments, the noise suppression model 260 may be implemented based on a deep neural network (DNN). As illustrated in FIG. 3 or 4, the noise suppression model 260 may include a noise suppression module 361 and a feature extraction module 363. The noise suppression module 361 may suppress noise of an input signal. The feature extraction module 363 may output enhanced data by performing feature extraction on the output of the noise suppression module 361.

The SED model 270 may perform SED on the output of the noise suppression model 260. As illustrated in FIG. 3 or 4, the SED model 270 may include a plurality of feature extraction layers 377 and classification layers 379 disposed at the ends of the feature extraction layers 377, respectively. In some embodiments, the SED model 270 may be implemented based on a convolutional recurrent neural network (CRNN). In such a case, the feature extraction layers 377 may include convolution layers, respectively. The classification layer 379 may include a fully-connected layer.

According to various embodiments, after being individually pre-trained, the noise suppression model 260 and the SED model 270 may be jointed as the joint model 150. For example, SED that is robust against a noise environment may be performed by training by the joint model 150.

As illustrated in FIG. 3, the noise suppression model 260 is trained to output enhanced data close to clean data with respect to input noise data. For example, a time-domain sound source separation model may be used as the noise suppression model 260. The sound source separation model may suppress noise by separating the noise and a clean signal from each other. Specifically, the noise suppression module 361 may output an enhanced way by suppressing noise from a noisy way. Furthermore, the feature extraction module 363 may output an enhanced log-mel spectrogram by performing feature extraction on the enhanced way. Accordingly, the noise suppression model 260 may finally output an enhanced log-mel spectrogram as enhanced data. In this case, the log-mel spectrogram is obtained by converting an input signal form a value in a time axis to a value in a frequency axis through a short-time Fourier transform (STFT) and then converting the signal into a mel scale in which the hearing system of a person has been incorporated.

Furthermore, the noise suppression model 260 may be trained through a deep feature loss function. To this end, an auxiliary model 365 may be used. The auxiliary model 365 may be implemented as the same structure as the SED model 270. That is, the auxiliary model 365 may include a plurality of feature extraction layers 367 and classification layers 369 disposed at the ends of the feature extraction layers 367, respectively. For example, the auxiliary model 365 may be a CRNN-based model that is pre-trained to derive results from clean data. However, the auxiliary model 365 may have a weight that is fixed during the training of the auxiliary model 365. In other words, a parameter of the auxiliary model 365 may be fixed through weight freezing so that the parameter is not updated during the training. The auxiliary model 365 may take an L1 loss function between outputs of the respective feature extraction layers 367 with respect to two inputs. The inputs may include the output of the noise suppression model 260, that is, an enhanced log-mel spectrogram, and clean data, that is, a clean log-mel spectrogram. In this case, the outputs of the feature extraction layers 367 may also be denoted as activation features. The L1 loss function may mean a loss function that minimizes the sum of errors by taking an absolute value with respect to a difference value between an actual value and a predicted value. The L1 loss function obtained as described above may be used as the deep feature loss function. The deep feature loss function that is used to train the noise suppression model 260 is represented like Equation 1.

$$\mathcal{L}(s, n) = \sum_{m=1}^{M} \|\Omega^m(F(s)) - \Omega^m(F(N(n)))\|_1 \quad \text{[Equation 1]}$$

In Equation 1, s and n may mean input clean data and noise data, respectively. M may mean the number of feature extraction layers. Furthermore, N(•) may mean a noise suppression operation of the noise suppression model 260. F(•) may mean a feature extraction operation. Ωm(•) may mean the output of an m-th feature extraction layer of the auxiliary model.

Furthermore, as illustrated in FIG. 3, the SED model 270 may be trained to perform SED on the output of the noise suppression model 260. For example, a CRNN-based classification model may be used as the SED model 270. As described above, the SED model 270 may be implemented as the same structure as the auxiliary model 365 that is used to pre-train the noise suppression model 260. That is, the SED model 270 may include the plurality of feature extraction layers 377 and the classification layers 379 disposed at the ends of the feature extraction layers 377, respectively. In this case, the auxiliary model 365 may use a clean log-mel spectrogram as its input, whereas the SED model 270 may use, as its input, a noise log-mel spectrogram having noise. Specifically, the SED model 270 is trained to detect the start location and end location of a sound event from an input and to estimate type of corresponding sound event.

According to various embodiments, the noise suppression model 260 and the SED model 270 that are individually pre-trained as described above may be jointed to implement the joint model 150. The pre-training of each of the noise suppression model 260 and the SED model 270 may be performed in the computing device 100, but the present disclosure is not limited thereto. The pre-training of the noise suppression model 260 and the SED model 270 may be performed in a server or an external device. Furthermore, for example, at least one model that has been pre-trained in a server or an external device may be received by the computing device 100 through a communication module. The noise suppression model 260 and the SED model 270 may be jointed in the computing device 100, thereby generating the joint model 150.

In this case, in the joint model 150, the classification layer 379 of the SED model 270 may have a weight that is fixed while the joint model 150 is driven. The joint model 150 is implemented by the joint of the two models, and thus may have a characteristic in that the joint model 150 is easily overfitted depending on an increase in the number of learnt parameters and the size of a data set. In order to solve such a problem, with respect to the joint model 150, the number of data sets may be doubled, and a weight of the classification layer 379 of the SED model 270, which is not directly involved in training, may be fixed so that the weight is not updated in the training process of the joint model 150. The classification layer 379 may be disposed at the last of the joint model 150, and may play a role of compressing with the number of sound event classes.

Furthermore, the joint model 150 may further include a plurality of attention modules 470. To this end, when the individually pre-trained noise suppression model 260 and SED model 270 are jointed, the attention modules 470 may be added. As illustrated in FIG. 4, the attention modules 470 may be connected to the feature extraction layers 377 of the SED model 270, respectively. Furthermore, the attention modules 470 may incorporate an output from the noise suppression model 260 into the feature extraction layers 377, respectively. For example, each of the attention modules 470 may be constructed as illustrated in FIG. 5.

According to various embodiments, the joint model 150 may be newly trained after the individually pre-trained noise suppression model 260 and SED model 270 are jointed. That is, the joint model 150 may be fine-tuned by being trained through the final SED loss function. In this case, while the joint model 150 is trained through the SED loss function, a parameter of the classification layer 379 may be fixed without being updated. A mismatch between the two models pre-trained for different purposes, that is, the noise suppression model 260 and the SED model 270, is made to pass as one loss function. As a result, SED performance that is robust against noise can be secured with respect to the joint model 150.

According to various embodiments, performance of the joint model 150 was derived as in Table 1 and Table 2. In this case, Table 1 illustrates results that were derived based on noise data generated through simulations. Table 2 illustrates results that were derived based on noise data recorded in an actual environment. A "baseline" illustrates the results of the execution of SED without noise suppression. "Before JT" illustrates results obtained by individually performing noise suppression and SED by using the individually pre-trained noise suppression model and SED model. When "Before JT" is compared with the "baseline", classification performance of noise data was degraded due to the distortion of some section attributable to a mismatch between the noise suppression model and the SED model. "After JT" illustrates results obtained by simultaneously performing noise suppression and SED by using the newly trained joint model. When "After JT" is compared with the "baseline", classification performance of noise data was improved. In addition, as the weight freezing scheme and the attention scheme are added to the newly trained joint model, classification performance was further improved. That is, an F-score was increased, and an error rate was decreased. Furthermore, if the SED model is implemented based on the CRNN, the SED model has better classification performance compared to a case in which the SED model is implemented based on a convolution neural network (CNN) or a recurrent neural network (RNN).

TABLE 1

| | Model | | Evaluation | |
|---|---|---|---|---|
| Method | NS | SED | F-score (%) | Error rate |
| Baseline | — | CRNN | 33.7 | 0.78 |
| Before JT (pre-trained) | GC3-TCN | CRNN | 31.4 | 0.81 |
| After JT (fine-tuned) | GC3-TCN | CRNN | | |
| | | w/o attention + w/o freeze | 42.4 | 0.70 |
| | | w/o attention + freeze dense CNN | 43.6 | 0.68 |
| | | w/o attention + freeze dense CNN | 38.0 | 0.74 |
| | | w/o attention + freeze dense RNN | 34.3 | 0.78 |
| | | w/o attention + freeze dense CRNN | 45.2 | 0.66 |
| | | w/attention + freeze dense | | |

TABLE 2

| | Model | | Evaluation | |
|---|---|---|---|---|
| Method | NS | SED | F-score (%) | Error rate |
| Baseline | — | CRNN | 41.9 | 0.71 |
| Before JT (pre-trained) | GC3-TCN | CRNN | 36.0 | 0.75 |
| After JT (fine-tuned) | GC3-TCN | CRNN | | |
| | | w/o attention + w/o freeze | 48.7 | 0.66 |
| | | w/o attention + freeze dense | 50.5 | 0.64 |
| | | CNN | 47.8 | 0.66 |
| | | w/o attention + freeze dense RNN | 44.6 | 0.69 |
| | | w/o attention + freeze dense CRNN | 51.9 | 0.62 |
| | | w/attention + freeze dense | | |

Figure 6:
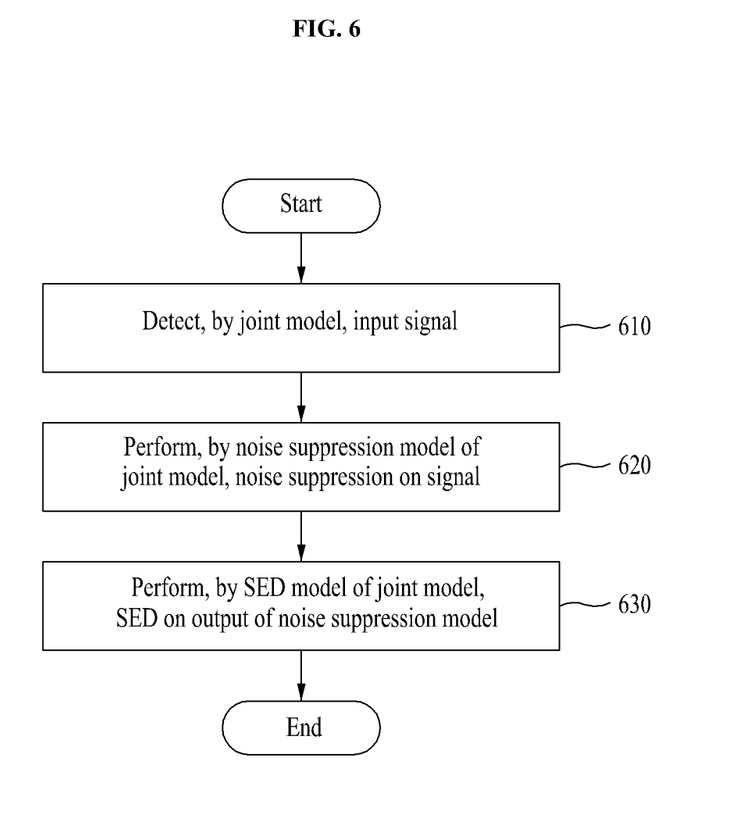
FIG. 6 is a diagram illustrating a method of the computing device according to various embodiments.

FIG. 6 is a diagram illustrating a method of the computing device 100 according to various embodiments.

Referring to FIG. 6, in step 610, the joint model 150 may detect an input signal. The joint model 150 includes the noise suppression model 260 and the SED model 270, and may be implemented as the noise suppression model 260 and the SED model 270 are jointed. The noise suppression model 260 may include the noise suppression module 361 and the feature extraction module 363. The SED model 270 may include the plurality of feature extraction layers 377 and the classification layers 379 disposed at the ends of the feature extraction layers 377, respectively.

In this case, after being individually pre-trained, the noise suppression model 260 and the SED model 270 may be jointed as the joint model 150. Furthermore, in the joint model 150, the classification layer 379 of the SED model 270 may have a weight that is fixed while the joint model 150 is driven. Furthermore, the joint model 150 may further include the plurality of attention modules 470. That is, when the individually pre-trained noise suppression model 260 and SED model 270 are jointed, the attention modules 470 may be added. Thereafter, the joint model 150 may be newly trained. That is, after the individually pre-trained noise suppression model 260 and SED model 270 are jointed to implement the joint model 150, the joint model 150 may be newly trained.

Next, in step 620, the noise suppression model 260 of the joint model 150 may perform noise suppression on the signal. The noise suppression model 260 may output an output close to clean data, that is, enhanced data, by performing noise suppression on the input signal. In some embodiments, the noise suppression model 260 may be implemented based on a deep neural network (DNN). The noise suppression module 361 may suppress noise with respect to the input signal. The feature extraction module 363 may output enhanced data by performing feature extraction on the output of the noise suppression module 361.

Next, in step 630, the SED model 270 of the joint model 150 may perform SED on the output of the noise suppression model 260. In some embodiments, the SED model 270 may be implemented based on a CRNN. In such a case, the feature extraction layers 377 may include the convolution layers, respectively. The classification layer 379 may include the fully-connected layer. In an embodiment, the computing device may identify the type of sound event that is input as the results of the execution of the noise suppression and SED by the joint model 150. For example, the computing device 100 may identify whether an input sound event is a voice or cough sound of a user, a knock, or the ringtone of a mobile phone by using the joint model 150, but a sound which may be identified by the computing device 100 is not limited thereto.

Various embodiments can improve SED performance that is robust against a noise environment by using the joint model in which the noise suppression model and the SED model have been jointed. Various embodiments can improve robust SED performance by being applied to various SED-based applications in an actual environment in which noise is present.

The aforementioned device may be implemented as a hardware component, a software component, or a combination of a hardware component and a software component. For example, the device and component described in the embodiments may be implemented using one or more general-purpose computers or special-purpose computers, such as a processor, a controller, an arithmetic logic unit (ALU), a digital signal processor, a microcomputer, a field programmable gate array (FPGA), a programmable logic unit (PLU), a microprocessor, or any other device capable of executing or responding to an instruction. The processing device may perform an operating system (OS) and one or more software applications that are executed on the OS. Furthermore, the processing device may access, store, manipulate, process, and generate data in response to the execution of software. For convenience of understanding, one processing device has been illustrated as being used, but a person having ordinary knowledge in the art may understand that the processing device may include a plurality of processing elements and/or a plurality of types of processing elements. For example, the processing device may include a plurality of processors or one processor and one controller. Furthermore, another processing configuration, such as a parallel processor, is also possible.

Software may include a computer program, a code, an instruction or a combination of one or more of them, and may configure a processing device so that the processing device operates as desired or may instruct the processing devices independently or collectively. The software and/or the data may be embodied in any type of machine, a component, a physical device, or a computer storage medium or device in order to be interpreted by the processing device or to provide an instruction or data to the processing device. The software may be distributed to computer systems that are connected over a network, and may be stored or executed in a distributed manner. The software and the data may be stored in one or more computer-readable recording media.

The method according to various embodiments may be implemented in the form of a program instruction executable by various computer means, and may be stored in a computer-readable medium. The medium may continue to store a program executable by a computer or may temporarily store the program for execution or download. Furthermore, the medium may be various recording means or storage means having a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as a CD-ROM and a DVD, magneto-optical media such as a floptical disk, a ROM, a RAM, and a flash memory. Furthermore, other examples of the medium may include an app store in which apps are distributed, a site in which other various pieces of software are supplied or distributed, and recording media and/or storage media managed in a server.

Various embodiments of this document and the terms used in the embodiments are not intended to limit the technology described in this document to a specific embodiment, but should be construed as including various changes, equivalents and/or alternatives of a corresponding embodiment. Regarding the description of the drawings, similar reference numerals may be used in similar components. An expression of the singular number may include an expression of the plural number unless clearly defined otherwise in the context. In this document, an expression, such as "A or B", "at least one of A and/or B", "A, B or C" or "at least one of A, B and/or C", may include all of possible combinations of listed items together. Expressions, such as "a first," "a second," "the first" or "the second", may modify corresponding components regardless of its sequence or importance, and are used to only distinguish one component from another component and do not limit corresponding components. When it is described that one (e.g., a first) component is "(functionally or communicatively) connected to" or "coupled with" the other (e.g., a second) component, one component may be directly connected to another component or may be connected to another component through another component (e.g., a third component).

The term "module" used in the present disclosure includes a unit configured as hardware, software or firmware, and may be interchangeably used with a term, such as logic, a logical block, a part or a circuit. The module may be an integrated part, a minimum unit to perform one or more functions, or a part thereof. For example, the module may be configured as an application-specific integrated circuit (ASIC).

According to various embodiments, each (e.g., a module or a program) of the aforementioned components may include a single entity or a plurality of entities. According to various embodiments, one or more of the aforementioned components or steps may be omitted or one or more other components or steps may be added. Alternatively or additionally, a plurality of components (e.g., modules or programs) may be integrated into a single component. In such a case, the integrated component may identically or similarly perform a function performed by a corresponding one of the plurality of components before one or more functions of each of the plurality of components. According to various embodiments, steps performed by a module, a program or another component may be executed sequentially, in parallel, iteratively or heuristically, or one or more of the steps may be executed in different order or may be omitted, or one or more other steps may be added.

The embodiments of the disclosure in which an exclusive property or privilege is claimed are defined as follows:

1. A computing device for a sound event detection (SED) technology robust against a noise environment, the computing device comprising:
    a memory;
    an input module configured to obtain a sound event input; and
    a processor connected to the memory and the input module and configured to execute at least one instruction stored in the memory,
    wherein the processor is configured to obtain a joint model for performing noise suppression and SED on the sound event input and identify a type of the sound event input by using the joint model, and
    a noise suppression model and an SED model are jointed as the joint model,
    wherein the joint model is a model generated by further being trained after the noise suppression model and the SED model are joined,
    wherein the SED model in the joint model comprises a plurality of feature extraction layers to which an output of the noise suppression model in the joint model is input, and a classification layer disposed at an end of the plurality of feature extraction layers, and
    wherein weights of the classification layer are fixed and not updated during the training after the noise suppression model and the SED model are joined.

2. The computing device of claim 1, wherein each of the noise suppression model and the SED model has been pre-trained before the noise suppression model and the SED model are joined.

3. The computing device of claim 1, wherein the joint model comprises a plurality of attention modules connected to the plurality of feature extraction layers, respectively, and configured to incorporate the output of the noise suppression model into the plurality of feature extraction layers, respectively.

4. The computing device of claim 1, wherein the noise suppression model is implemented based on a deep neural network (DNN),
    wherein the SED model is implemented based on a convolutional recurrent neural network (CRNN),
    wherein the plurality of feature extraction layers comprise convolution layers, respectively, and
    wherein the classification layer comprises a fully-connected layer.

5. A method of a computing device for a sound event detection (SED) technology robust against a noise environment, the method comprising:
    obtaining a sound event input;
    obtaining a joint model for performing noise suppression and SED on the sound event input; and
    identifying a type of the sound event input by using the joint model,
    wherein a noise suppression model and an SED model are jointed as the joint model,
    wherein the joint model is a model generated by further being trained after the noise suppression model and the SED model are joined,
    wherein the SED model in the joint model comprises a plurality of feature extraction layers to which an output of the noise suppression model in the joint model is input, and a classification layer disposed at an end of the plurality of feature extraction layers, and
    wherein weights of the classification layer are fixed and not updated during the training after the noise suppression model and the SED model are joined.

6. The method of claim 5, wherein each of the noise suppression model and the SED model has been pre-trained before the noise suppression model and the SED model are joined.

7. The method of claim 5,
    wherein the joint model comprises a plurality of attention modules connected to the plurality of feature extraction layers, respectively, and configured to incorporate the output of the noise suppression model into the plurality of feature extraction layers, respectively.

* * * * *